US011170563B2

(12) United States Patent
Radel et al.

(10) Patent No.: US 11,170,563 B2
(45) Date of Patent: Nov. 9, 2021

(54) IMMERSIVE ENVIRONMENT WITH DIGITAL ENVIRONMENT TO ENHANCE DEPTH SENSATION

(71) Applicant: 8259402 CANADA INC., Dorval (CA)

(72) Inventors: Jason Carl Radel, Montreal (CA); Fernando Petruzziello, Montreal (CA)

(73) Assignee: 8259402 CANADA INC., Dorval (CA)

( * ) Notice: Subject to any disclaimer, the term of this patent is extended or adjusted under 35 U.S.C. 154(b) by 15 days.

(21) Appl. No.: 16/238,568

(22) Filed: Jan. 3, 2019

(65) Prior Publication Data

US 2019/0206118 A1 Jul. 4, 2019

Related U.S. Application Data

(60) Provisional application No. 62/613,604, filed on Jan. 4, 2018.

(51) Int. Cl.
| | |
|---|---|
| *G02B 5/10* | (2006.01) |
| *G06T 15/30* | (2011.01) |
| *G06T 15/08* | (2011.01) |
| *G09G 3/00* | (2006.01) |
| *G06T 19/20* | (2011.01) |
| *H04N 13/122* | (2018.01) |
| *G06T 15/50* | (2011.01) |
| *G02B 30/40* | (2020.01) |

(52) U.S. Cl.
CPC .............. *G06T 15/30* (2013.01); *G02B 30/40* (2020.01); *G06T 15/08* (2013.01); *G06T 15/50* (2013.01); *G06T 19/20* (2013.01); *G09G 3/003* (2013.01); *H04N 13/122* (2018.05); *G02B 5/10* (2013.01); *G06T 2219/008* (2013.01)

(58) Field of Classification Search
CPC ......... G06T 15/30; G06T 15/08; G02B 30/40; G09G 3/003
See application file for complete search history.

(56) References Cited

U.S. PATENT DOCUMENTS

| | | | | |
|---|---|---|---|---|
| 5,880,733 | A * | 3/1999 | Horvitz | G06F 3/04815 715/850 |
| 6,230,116 | B1 | 5/2001 | Ronen et al. | |
| 6,597,358 | B2 | 7/2003 | Miller | |
| 7,107,549 | B2 | 9/2006 | Deaton et al. | |
| 2005/0264857 | A1* | 12/2005 | Vesely | G06F 3/0346 359/13 |
| 2009/0066786 | A1* | 3/2009 | Landa | G02B 30/00 348/54 |

(Continued)

FOREIGN PATENT DOCUMENTS

| | | | |
|---|---|---|---|
| WO | WO2018161163 | 9/2018 | |
| WO | WO-2018161163 A1 * | 9/2018 | ............. G02B 30/35 |

*Primary Examiner* — Samantha (Yuehan) Wang
(74) *Attorney, Agent, or Firm* — Benoit & Cote Inc.; Charles-André Caron

(57) ABSTRACT

There is described a method for operating an immersive display. A plurality of objects are displayed to a viewer within an immersive environment. A computer system controls an image rendering of the immersive environment and a size, location and appearance of each one of the plurality of objects. The controls can be made by the operating system adapted to this task. Such controls provide a monocular psychological depth cue to the viewer for each one of the plurality of objects.

19 Claims, 10 Drawing Sheets

(56) References Cited

U.S. PATENT DOCUMENTS

| | | | | |
|---|---|---|---|---|
| 2011/0075257 A1* | 3/2011 | Hua | ............... | H04N 13/322 |
| | | | | 359/464 |
| 2012/0287125 A1* | 11/2012 | Liu | ............... | G02B 30/40 |
| | | | | 345/419 |
| 2015/0035821 A1* | 2/2015 | Andriotis | ............... | G06T 15/20 |
| | | | | 345/419 |
| 2015/0254882 A1* | 9/2015 | Englert | ............... | G02B 27/0093 |
| | | | | 345/633 |
| 2017/0105052 A1* | 4/2017 | DeFaria | ............... | H04N 21/2225 |
| 2018/0259903 A1* | 9/2018 | Paige | ............... | G02B 3/08 |
| 2018/0300854 A1* | 10/2018 | Dmitrenko | ............... | G06T 15/04 |
| 2018/0322685 A1* | 11/2018 | Yi | ............... | G06T 15/04 |

* cited by examiner

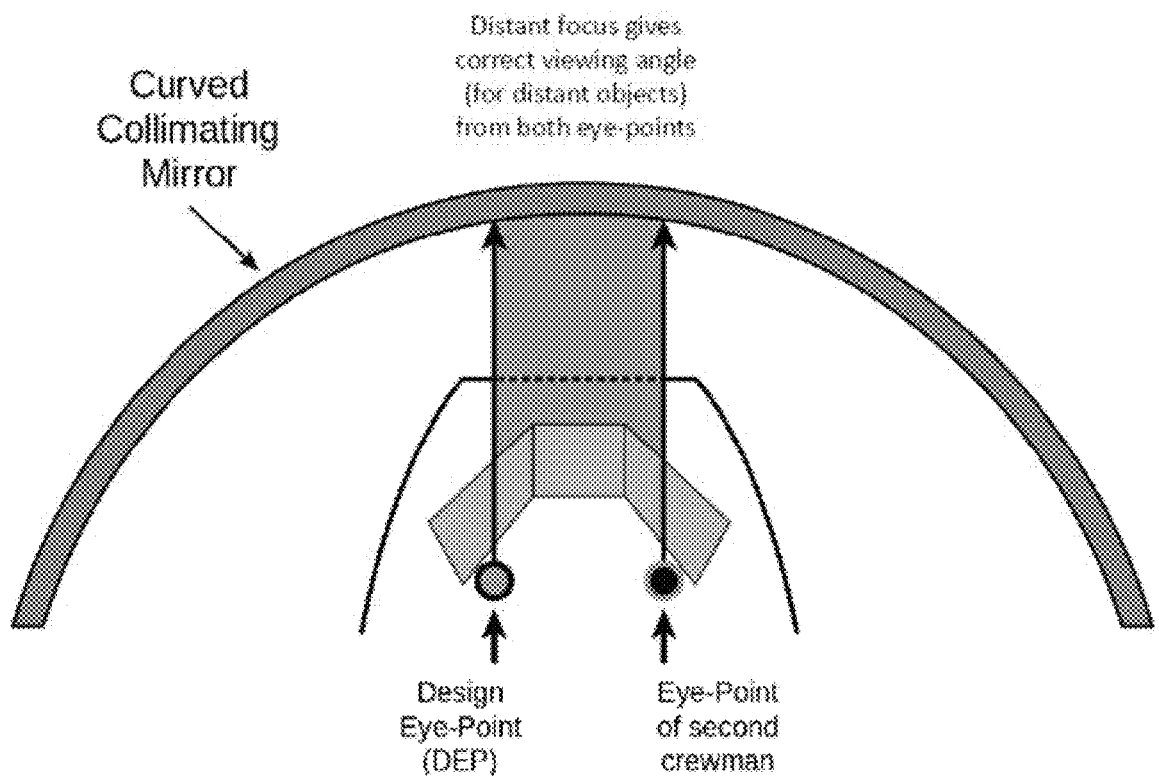
FIGURE 12 PRIOR ART
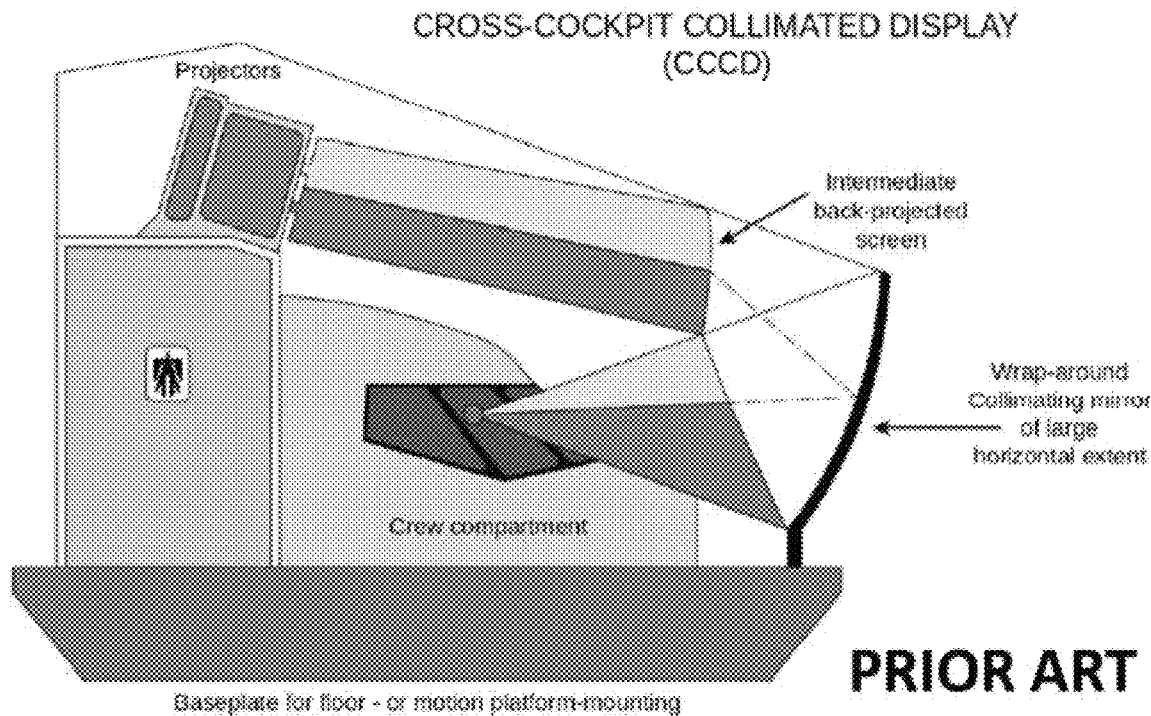
PRIOR ART
FIGURE 13

IMMERSIVE ENVIRONMENT WITH DIGITAL ENVIRONMENT TO ENHANCE DEPTH SENSATION

CROSS-REFERENCE TO RELATED APPLICATIONS

This application claims benefit of U.S. provisional patent application 62/613,604, filed Jan. 4, 2018, the specification of which is hereby incorporated herein by reference in its entirety.

BACKGROUND

(a) Field

The subject matter disclosed generally relates to immersive displays. More specifically, it relates to a digital environment used in the context of an immersive display.

(b) Related Prior Art

There are many displays made to provide an immersive environment to users. These displays can be used with a computer system which provides contents to the display. In some cases, the computer system can have an operating system (OS) adapted to the specific display. Alternatively, displays can use a standard OS, but include an immersive "desktop" (in terms of user interface) where the user can select an application. These immersive displays exist in various types. Current display systems used in immersive environments include:

Collimated displays—projected image at >60 ft.;
Front or rear projection-based display systems (no mirrors involved);
Head-mounted displays for virtual reality.

There will further be discussed below, in relation with the invention, an immersive display with customized imaging surface which does not image at infinity and which provides particular advantages over typical prior art collimated displays.

Head-mounted displays (HMDs) are more widely used to immerse the wearer in virtual reality. By wearing the display in front of the eyes, and by including various optical systems in the display, the user is presented visual content that can adapt to the movement of the user's head, for example. However, the user is required to wear the HMD at all times to enjoy the immersive content, a situation that is not always desirable, especially if the user is to be immersed for long periods, e.g., for training in a flight simulator or for working in an immersive work station.

Virtual reality and augmented reality systems must also be small enough to wear. Consequently, it is hard to incorporate high resolution and high quality displays. Virtual reality displays also suffer from the depth cue conflicts such as the vergence-accommodation conflict, i.e., the distance at which a viewer focuses their eyes to see the image clearly is not consistent with the distance they perceive the image via stereoscopic cues. Virtual reality displays also have problems with motion sickness.

Front or rear projection-based display systems provide a simple setting creating an immersive experience for a user. Although relatively simple to install and convenient for many purposes, such as watching movies, these displays suffer from an unrealistic depth sensation, since images are projected onto a screen having a fixed distance to the viewers, and therefore the viewer is not completely immersed into the experience since there is no depth differentiation between objects in the image. This can be corrected in part by wearing 3D glasses which render the image stereoscopic, giving a sense of depth to the viewer. This can, however, be uncomfortable (especially for long-time use or for users already wearing optical glasses) and create a lack of realism since 3D glasses need to be worn to reproduce a reality where no glasses would ordinarily be worn. In other words, the fact that 3D glasses are worn intrinsically is a situation that differs from real life. These displays also suffer from the vergence-accommodation conflict.

Another type of immersive display is the collimated display. Notably, flight simulators use a collimated display to provide an immersive environment, which can be used by two people simultaneously. This industry makes use of concave mirrors to produce a virtual image that can be seen by both pilots in the cockpit with the exact same angle. A collimated display is one in which the display facing the user is not a conventional, but rather a reflecting screen (i.e., a concave mirror) on which an image is projected by a reflection on an intermediate display screen. These reflections are used to provide an image, as seen by the user, which is a virtual image created at infinity of the object (i.e., the display screen). The display screen is approximately positioned so that light reflecting from the surface will be nearly collimated after reflecting from the mirror.

The advantages of using a virtual image display on concave mirrors can be seen in FIGS. 10-15. These figures show the technological context in which collimated displays can be used, according to the current state of the art in flight simulators.

FIG. 10 shows a flight simulator environment in which both pilots are installed in a cockpit and have a cross-cockpit view displayed on a direct projection screen as most people are accustomed to in everyday life. This type of display is not well suited to this environment, since the screen is located at a limited distance from both pilots and therefore, each pilot will see a given object displayed on the screen at a different angle, whereas in real life, they should appear at substantially the same angle for both pilots, since the real-life object would be distant from both pilots, as shown in the explaining diagram of FIG. 11. Direct-projection displays therefore produce an angular error that negatively affects the quality of the simulation. In the flight simulation example, both pilots must see distant objects at the same angle to provide the pilots with high-quality training.

FIGS. 12-13 illustrate a state-of-the-art flight simulator using a collimating mirror that images a virtual image at infinity (at least approximately). "Infinity" should be interpreted as it is defined in optics, i.e., far away, at a distance substantially greater than the focal length.

Imaging at infinity is advantageous as it provides the same angle of view of a given distant object for both pilots, as shown in FIG. 12. In this case, the state-of-the-art collimated display provides the same cross-cockpit view from both seats. As shown in FIG. 15, when pilots are in the cockpit and look at their command instruments in the cockpit dashboard, and then look at the cross-cockpit view, their eyes must refocus and reorient, giving a sense of realism greater than that of direct-projection displays.

The overall physical setting of such flight simulators is shown in FIGS. 13-14.

The image of an object formed from the reflection of light rays from a mirrored surface is known as the virtual image of the object. Current standard methods for determining the location of a virtual image for non-planar mirrors or lenses are limited in two ways: they are based on Gaussian optics, and hence are only valid when both the observer and object are near the optical axis of the lens or mirror, and/or they do not account for the different, conflicting depth cues used by a human observer to infer depth.

Collimated displays in the simulation industry provide a depth of the virtual image set to be greater than about 60 ft. (about 18.1 m) due to the imaging at "infinity", where the infinity is normally in a range not smaller than 60 ft. This does not allow a proper sense of depth when objects in the content being viewed are supposed to be located at a distance closer than this distance. There is described below a display providing a more immersive environment, taking into account depth cues that the user should see to sense the depth of nearby objects in the environment in which the user is immersed.

These displays primarily focus on creating realistic physiological depth cues for depth. Indeed, perceived depth for a human observer is based on a combination of physiological and psychological depth cues. For distances less than about 10 ft., the brain relies primarily on physiological cues to infer depth. For distances greater than about 60 ft., the brain relies primarily on psychological cues to infer depth. For intermediary distances the brain relies on a mixture of these cues. When a human being cannot accurately ascertain the depth of objects based on physiological or psychological depth cues, those cues are referred to as weak cues (or strong cues if the cues are sufficient for a human observer to accurately determine depth from them).

In the case of collimated displays, or other immersive displays as discussed below in relation with the invention, the physiological cues for depth are weak, meaning the viewer cannot accurately tell the depth of displayed scenes when relying only on physiological depth cues. In such cases the perceived depth of the rendered scene will largely depend on the strength of the psychological cues for depth. This is because collimated displays, or other immersive displays as discussed below in relation with the invention, do not provide a different image to both eyes (e.g., in contrast with headwear which provide independent images to both eyes using separate screens or lenses, or 3D screens where glasses are worn to isolate the images viewed independently by each eye).

When such displays are used, they can be used to display immersive media contents, such as the flight simulation discussed above. However, the user of the display may be allowed to exit from the media content and have to manipulate a graphical user interface (GUI) where other applications may be chosen and where other computer tasks can be performed, i.e., the user is able to manipulate files and start, close, modify or install applications. In other words, the display can be used to operate the GUI of an operating system (OS), installed on the computer system with which the display is associated.

An operating system is the environment in which the applications can run and also the environment in which the user can view the files, act on applications (install/uninstall, start, close, etc.), manage peripherals, and change computer parameters, for example. The operating system normally comprises a GUI by which these tasks can be performed. Most operating systems, at least those with which most people are familiar, involve icons, panels and windows to display contents, for example.

Various publications discuss the 3D rendering of such OS elements, for example U.S. Pat. Nos. 5,880,733, 6,230,116, 7,107,549 or U.S. Pat. No. 6,597,358, to name a few. Although they are directed to making elements appear as in 3D, these documents are directed to an environment to be displayed on a standard screen, where the contents are displayed directed on the screen by illumination (e.g., LCD screens, cathodic screens or more modern equivalents involving illumination of pixels on the screen).

SUMMARY OF THE INVENTION

According to an aspect of the invention, there is provided a method for operating an immersive display, the method comprising:
  displaying a plurality of objects within an immersive environment, to provide to a viewer an image rendering that is immersive; and
  by a computer system:
    controlling an image rendering of the immersive environment; and
    controlling a size and a location of each one of the plurality of objects,
to provide a monocular psychological depth cue to the viewer for each one of the plurality of objects.

According to an embodiment, displaying a plurality of objects within an immersive environment on a display screen distant from an observer at a distance D.

According to an embodiment, controlling an image rendering of the immersive environment comprises setting a near clipping plane to be equal to the distance D.

According to an embodiment, there is further provided a curved mirrored surface and a display screen to perform the displaying.

According to an embodiment, the curved mirrored surface and the display screen are provided at a distance D smaller than the distance that would produce collimated light when reflecting from the curved mirrored surface.

According to an embodiment, controlling an image rendering of the immersive environment comprises setting a near clipping plane to be equal to a distance from an observer to the curved mirrored surface.

According to an embodiment, fields of view rendered in the environment on the display screen substantially match fields of view subtended by the display.

According to an embodiment, controlling the image rendering of the immersive environment and the size and the location of each one of the plurality of objects comprises placing each one of the plurality of objects in the environment and controlling the image rendering of the immersive environment to provide visible parallel lines extending along reference elements in the immersive environment.

According to an embodiment, controlling a size and a location of each one of the plurality of objects comprises placing each one of the plurality of objects so that at least one of the plurality of objects occludes at least another one of the plurality of objects within the immersive environment.

According to an embodiment, controlling a size and a location of each one of the plurality of objects comprises applying a movement on the plurality of objects, or a lighting artifact thereof, shown at approximately constant speeds with respect to the immersive environment.

According to an embodiment, controlling an image rendering of the immersive environment comprises inserting or defining a reference element in the immersive environment, and wherein controlling a size and a location of each one of the plurality of objects comprises applying a rotation between each one of the plurality of objects and the reference element of the immersive environment.

According to an embodiment, there is further provided the step of applying a lighting gradient or a shadowing gradient onto a surface rendering of the each one of the plurality of objects depending on a respective location thereof in the immersive environment.

According to an embodiment, there is further provided the step of blurring or tinting a color rendering of the each one of the plurality of objects depending on a respective distance thereof from the viewer.

According to an embodiment, controlling an image rendering of the immersive environment comprises at least one of displaying a horizon or providing graphic elements in the immersive environment which define a vanishing point.

According to an embodiment, there is further provided the step of providing user controls for interacting with contents of the immersive environment and the plurality of objects.

According to another aspect of the invention, there is provided a method for operating an immersive display comprising a mirror which produces a virtual image, the method comprising:
  using a computer system to locate a plurality of digital objects within a digital environment on a display screen of an immersive display distant from an observer at a distance D to provide an image rendering that is immersive;
wherein displaying the plurality of digital objects within the digital environment is controlled by the computer system for setting at least one of a near clipping plane and a far clipping plane of the image rendering to be equal to a characteristic distance in the immersive environment defined from an observer to an optical element contributing to producing the virtual image.

According to an embodiment, the optical element to define the characteristic distance from the observer is the display screen.

According to an embodiment, the optical element to define the characteristic distance from the observer is the mirror.

According to an embodiment, displaying the plurality of digital objects comprises the computer system implementing at least one of the following:
  the digital objects are placed in an environment consisting of parallel lines extending along reference elements;
  the digital objects, or a lighting artifact thereof, are shown moving within the digital environment at approximately constant speeds; and
  a substantially constant rotation is applied between the objects and reference elements of the environment.

According to an embodiment, displaying the plurality of digital objects comprises the computer system implementing at least one of the following:
  lighting or shadowing gradients are provided onto a surface of the objects depending on a respective location thereof in the environment;
  objects are blurred or tinted depending on the respective distance from the viewer; and
  at least one of a horizon and a vanishing point is provided within rendered image.

According to another aspect of the invention, there is provided a method for operating a computer system for an immersive display, the method comprising:
  providing an operating system on the computer system that places a plurality of digital objects within a digital environment on a display screen of the immersive display distant from an observer at a distance D to provide an image rendering that is immersive;
wherein displaying the plurality of digital objects within the digital environment is controlled by the operating system on the computer system to implement a monocular psychological depth cue to the observer for each one of the plurality of objects, comprising setting at least one of a near clipping plane and a far clipping plane of the image rendering to be equal to a characteristic distance in the immersive environment defined from the observer.

According to an embodiment, the characteristic distance is defined from the observer to the display screen.

According to an embodiment, the image is produced by a mirror which images the display screen, and the characteristic distance is defined from the observer to the mirror.

According to an embodiment, the characteristic distance is defined from the observer to the rendered image.

According to an embodiment, the image is produced by a lens which images the display screen, and the characteristic distance is defined from the observer to the lens.

According to an embodiment, displaying the plurality of digital objects comprises the computer system implementing at least one of the following:
  the digital objects are placed in an environment consisting of parallel lines extending along reference elements;
  the digital objects, or a lighting artifact thereof, are shown moving within the digital environment at approximately constant speeds;
  a substantially constant rotation is applied between the objects and reference elements of the environment; and
  the image rendering comprises setting a near clipping plane or surface to be equal to the distance D from the observer.

According to an embodiment, displaying the plurality of digital objects comprises the computer system implementing at least one of the following:
  lighting or shadowing gradients are provided onto a surface of the objects depending on a respective location thereof in the environment;
  objects are blurred or tinted depending on the respective distance from the viewer; and
  at least one of a horizon and a vanishing point is provided within rendered image.

BRIEF DESCRIPTION OF THE DRAWINGS

Further features and advantages of the present disclosure will become apparent from the following detailed description, taken in combination with the appended drawings, in which:

FIG. 12 is a top view illustrating image display in a simulator using a collimating mirror, according to the prior art;

FIGS. 13-14 are a side view and a perspective view illustrating a flight simulator, according to the prior art;

It will be noted that throughout the appended drawings, like features are identified by like reference numerals.

DETAILED DESCRIPTION

Figure 1:
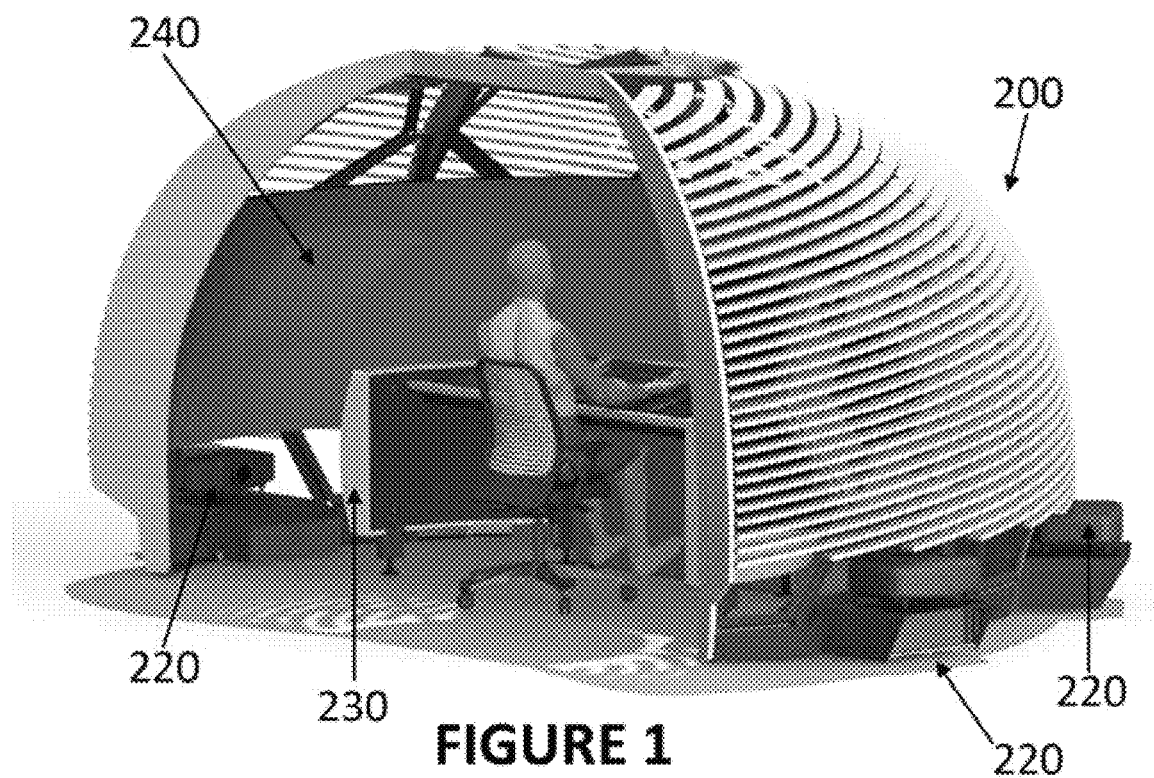
FIGS. 1-5 are respectively a perspective view, a front view, a top view, a side view and a rear view of an immersive work station, according to an embodiment.
Figure 2:
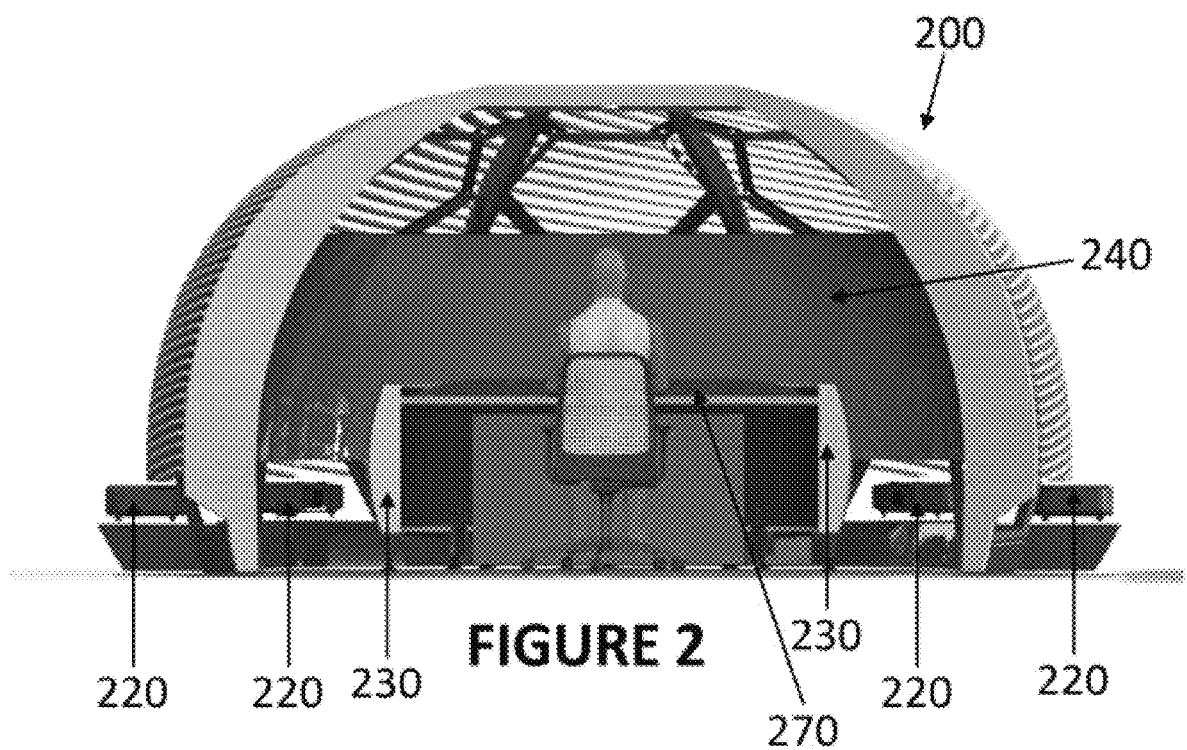
Figure 3:
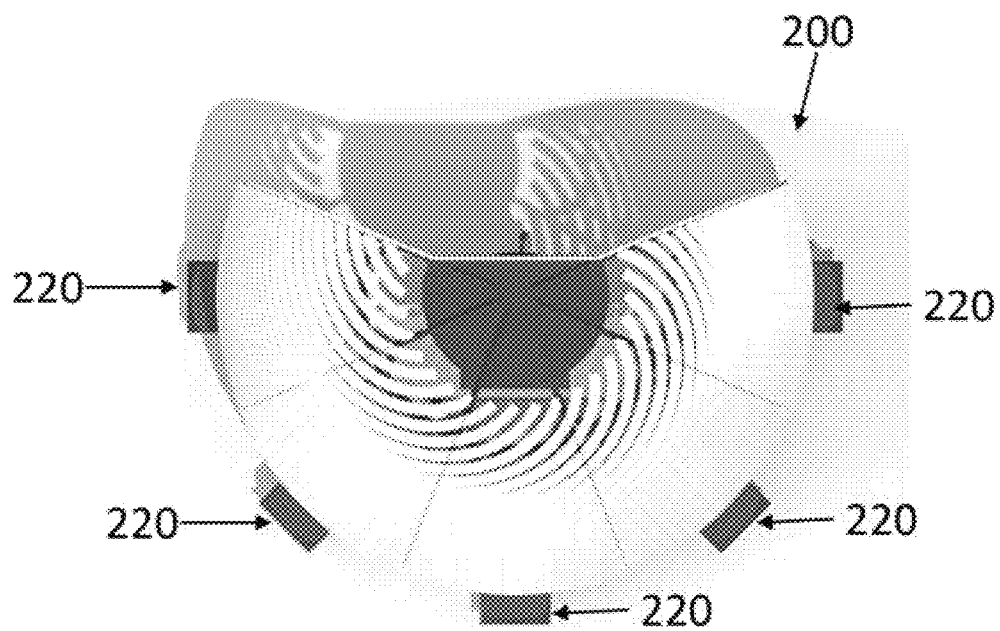
Figure 4:
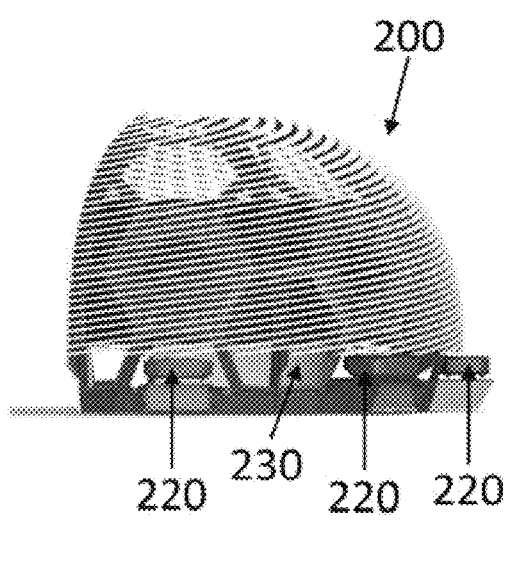
Figure 5:
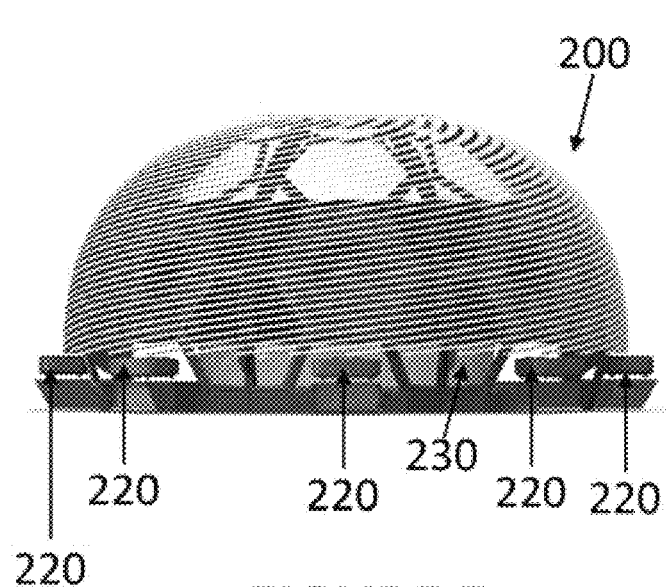
Figure 6:
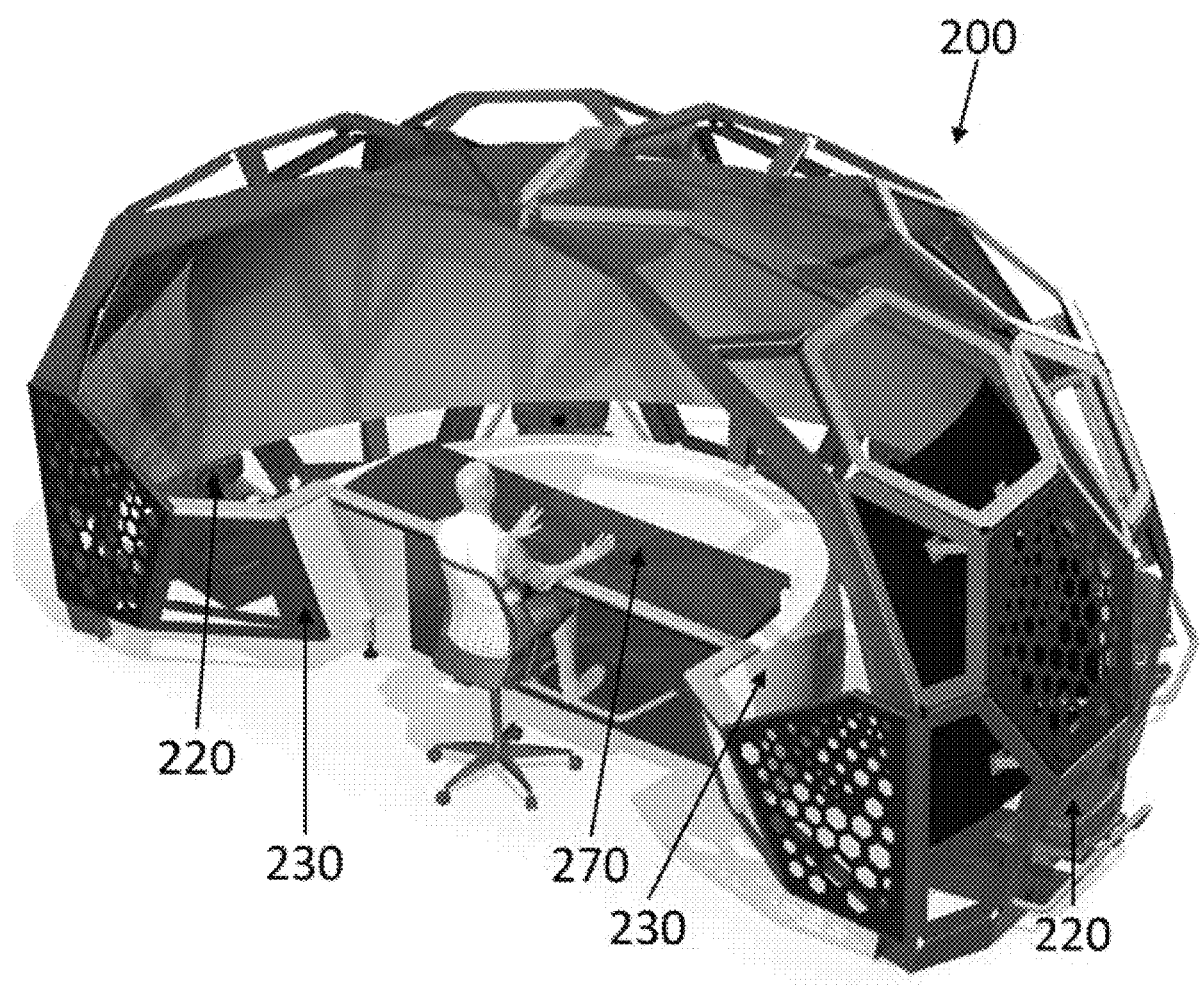
FIGS. 6-9 are respectively a perspective view, a top view, a front view and a side view of an immersive work station, according to another embodiment.
Figure 7:
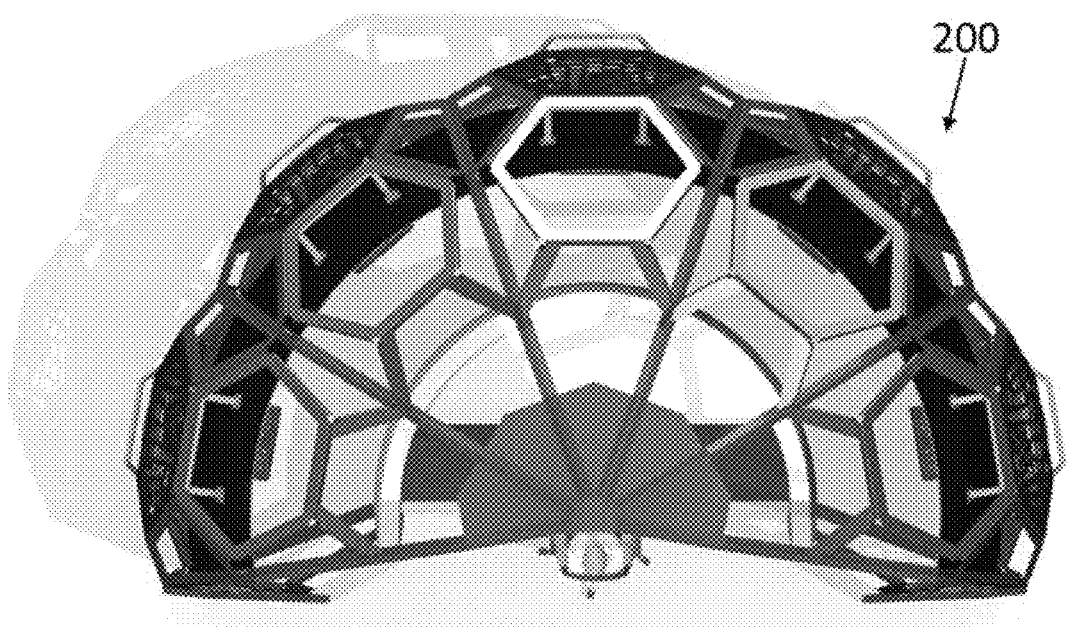
Figure 8:
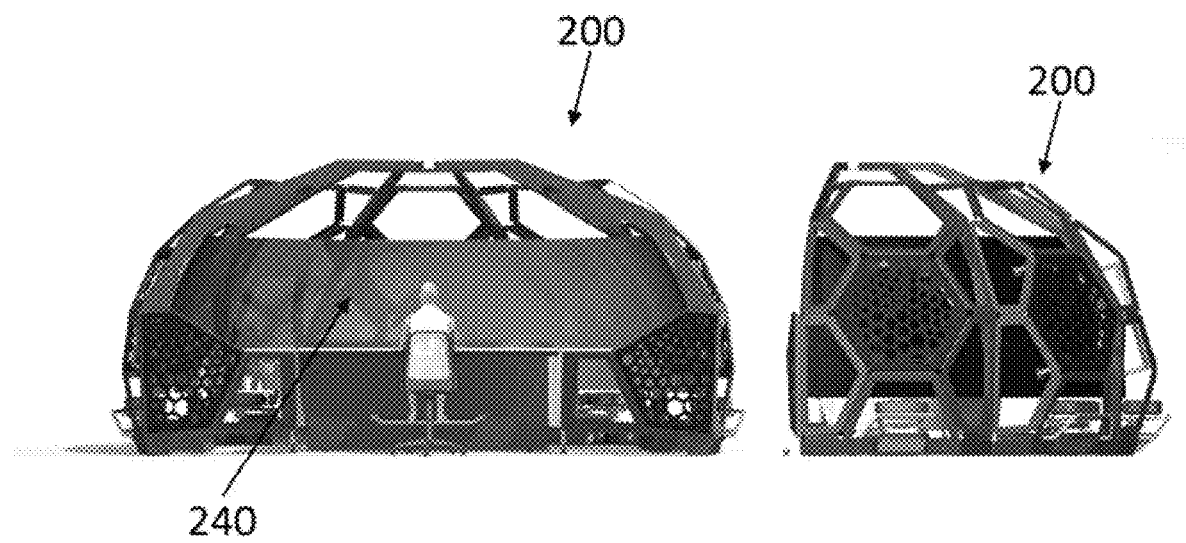
Figure 9:
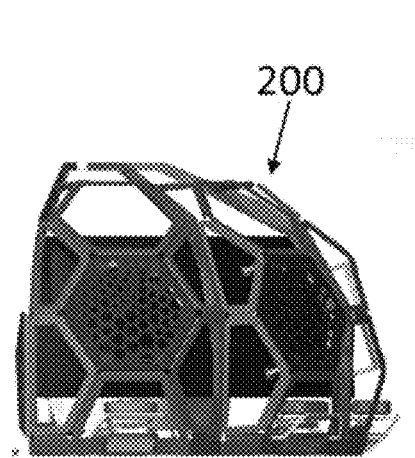
Figure 10:
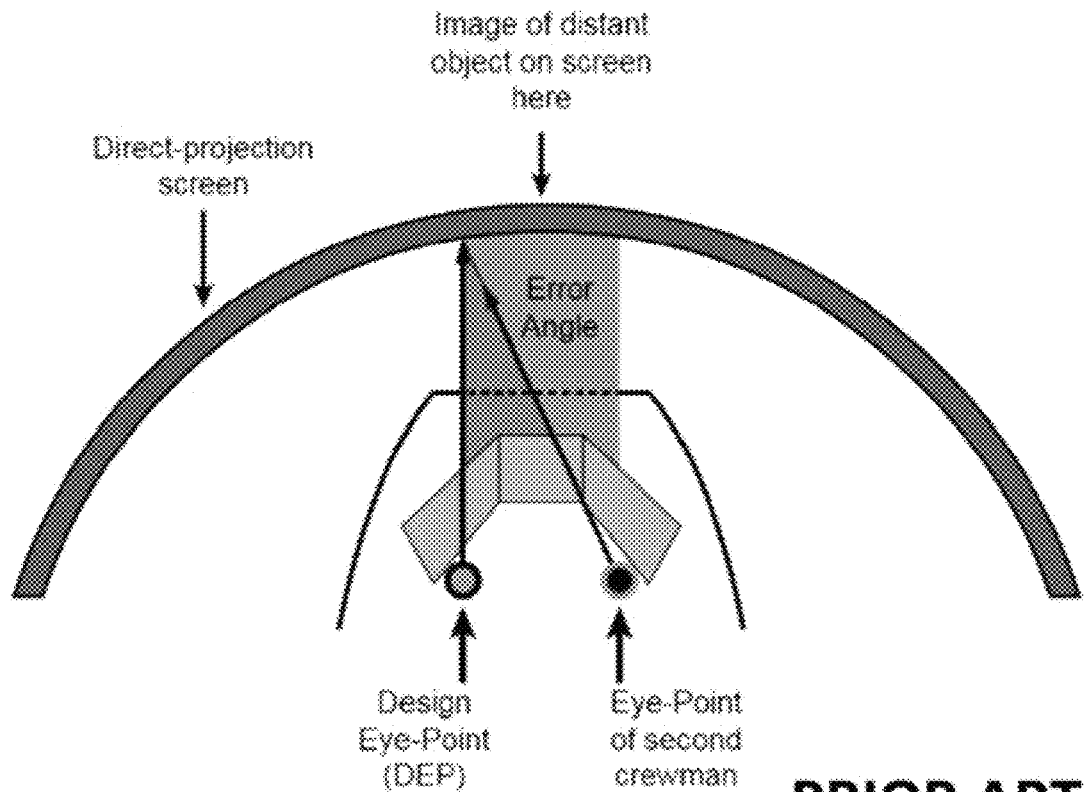
FIG. 10 is a top view illustrating image display in a simulator using a direct-projection screen, according to the prior art.
Figure 11:
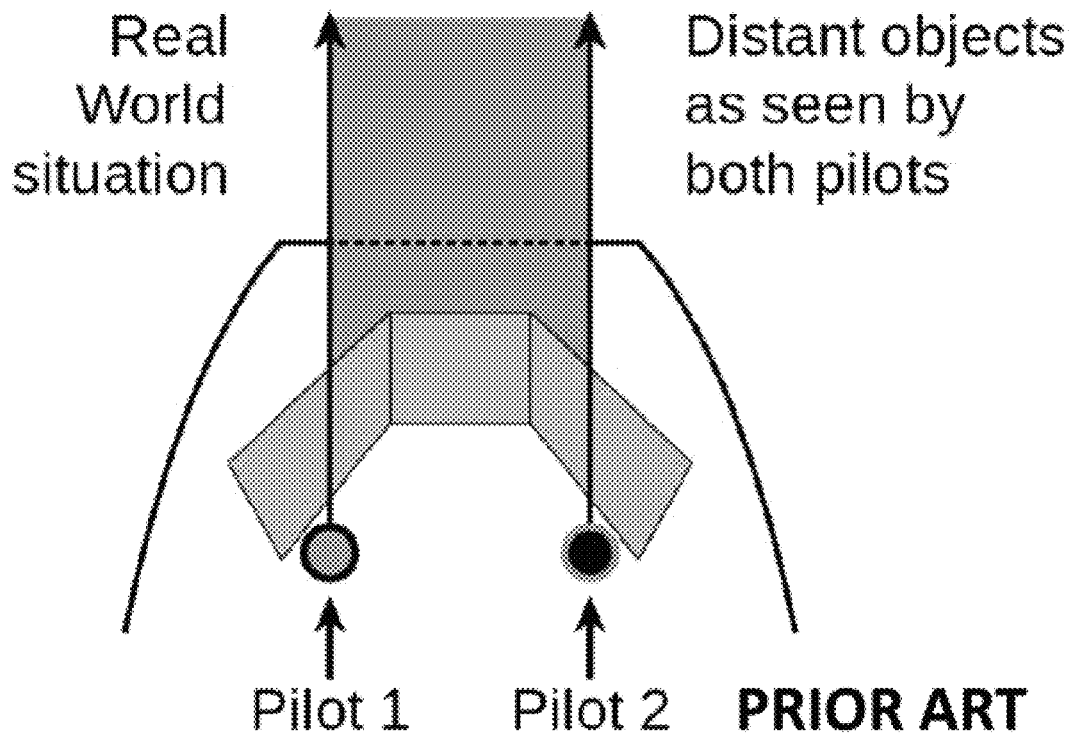
FIG. 11 is a top view illustrating image display in a simulator as should be seen by two pilots, according to the prior art.

There is described below the use of a digital environment designed to increase the perceived depth of digital content (comprising a plurality of digital objects) in an immersive environment (collimated display or more generally an immersive display such as the one described below) for a human observer. More particularly, the invention described here is a digital environment designed to provide very strong psychological cues for depth. This environment is designed to be displayed in an immersive environment (collimated display or immersive display such as the one described below), and to display a rendered image perceived to be 3D to the observer, without requiring headwear or eye/gaze tracking which would otherwise be helpful to provide physiological cues for depth perception but which are not used with collimated displays or immersive displays.

Most existing displays meant to render 3D content focus on creating strong physiological cues for depth (such as in VR headset where two different images are shown to each eye using material equipment such as a pair of screens or lenses in front of each eye), whilst then rendering application-specific scenes with consistent, but not necessarily strong, psychological cues for depth. For large immersive display systems, especially where physiological cues for depth are weak or marginal because no equipment is involved (no headset or no 3D glasses), the perceived depth of the image, and consequently the level of immersion, can be greatly enhanced by rendering scenes that provide the brain with very strong psychological cues for depth.

Further, such a digital scene can create additional opportunities for display in immersive environments. Using such a digital scene, an immersive environment can be created that displays scenes that provide very strong psychological depth cues to the observer together with physiological cues that are only approximately consistent with the scene. The result is a scene that is perceived to be three dimensional to the observer without the need for headwear of eye/gaze/head tracking. Physiological cues involve binocular cues, i.e., cues perceived by having the two eyes detect different things or act differently. Accommodation is an example of a monocular cue which is also physiological, since it involves contracting the lens of the eyes for real objects seen at a small distance, such as less than 2 meters. Other monocular cues are mostly psychological, as they involve brain perception (which can be "tricked" by presenting adequate images to the eyes) instead of physiological changes in the eyes (e.g., differential eye muscle contraction, lens contraction).

The digital scene may include computer-generated media content (e.g., video game, animation, etc.) or may also include the environment in which the user interacts with the system, i.e., the graphical user interface (GUI) of the operating system (OS).

Alternatively, the digital scene may include an application which involves GUI elements such as boxes, windows, panels, buttons and the like, i.e., selectable elements appearing on the display and with which the user is expected to interact. A web browser would be a good example, or any other application having a menu, windows, panels or buttons, or any application presenting objects in front of a background. In such an environment, standard selectable elements such as windows, boxes, panels, etc., meant to be used on a 2D operating system could be replaced with the same type of elements with a three-dimensional shape instead, or objects such as doors, windows, or portals placed to appear in an immersive 3D environment. For the purpose of user experience with the display and for better immersion and realism, these elements would benefit from a perception of depth when being displayed. Since collimated displays and immersive displays do not provide distinct screens or optical systems to isolate what is viewed by each eye, physiological cues for depth perception are significantly weaker than for VR headsets, for example, i.e., the left eye and the right eye are not presented different images as in a VR headset or in a 3D movie display involving glasses. Psychological cues for depth should thus be provided when the elements are being displayed in collimated displays and other immersive displays.

A digital environment (such as the GUI of an operating system, or the GUI of an application to be displayed in an immersive display, or any other graphical user interface) with digital content designed to provide psychological cues for depth that are as strong as possible (see following picture) can include, without limitation: occlusion, depth form motion, kinetic depth effect, familiar size, linear perspective, texture gradient, aerial perspective, relative size, defocus blur, and/or elevation. These real-life effects of which the human brain takes advantage can be applied in the digital environment by applying reproduction strategies to objects being displayed in order to reproduce these effects but in the digital environment, especially computer-generated objects such as windows, buttons, panels, icons, ornaments, background images (which can be composite images comprising different objects), and can also apply to media content, such as characters, objects of an animation, objects in a decor, etc.

Occlusion is an effect by which the brain identifies that one object partially hides another object and that, therefore, the object which partially hides the other one is located closer, and the one which is partially occluded is located farther. In the context of this invention, reproducing this "occlusion" effect comprises adding objects to the GUI that will occlude each other, and ensuring that the order by which each occlusion of an object with respect to another one reflect their intended depth. Superimposition of a more proximal object over a more distal object, as viewed from the viewer's point of view, provides an impression that the distal object is further away than the proximal object, as intended.

Depth from Motion is the effect by which depth can be assessed by the brain when an object has a motion with a significant component in the radial direction from the viewer. By moving, the object will become larger or smaller in the field of view of that person, thus assessing depth. In the context of this invention, reproducing this "depth from motion" effect involves making objects move along grid lines, or providing bright spots moving along grid lines, especially grid lines extending radially from the viewer or from a point near the viewer, such that the movement artificially given to the object in the user interface has a detectable component in a radial direction from the viewer. Movement along such grid lines, especially at a substantially constant speed (i.e., constant for a given moving object during its movement), gives an impression that what is displayed follows these lines and make the viewer perceive space and perceive that objects move within this space, with increasing or decreasing angular size, thus giving depth perception.

The kinetic depth effect refers to the eventual perception of depth of a three-dimensional object viewed in two dimensions, which arises after a period of time during which the object rotates, allowing the viewer to perceive depth and shape even though only a planar view of the object (e.g., its shadow) is being seen at a given instant. In the context of this invention, reproducing this "kinetic depth effect" involves placing objects in an environment having walls, a ceiling and/or a floor, and rotating and/or moving floor and/or ceiling and/or walls with respect to objects, or rotating and/or moving objects with respect to floor and/or ceiling and/or walls. This movement gives a perception of where an object is located with respect to its surrounding.

The "Familiar Size" effect occurs when the brain identifies objects having an absolute size that is already known and determines that their size in the environment should be as expected, thus assessing their distance depending on the angular size of the perceived object. In the context of this invention, reproducing this "Familiar Size" effect involves providing, in the digital environment, objects having a size that is already known outside the digital environment because they are objects with standard sizes with which any viewer will be familiar. These objects act as size-reference objects. For example, objects with standard sizes such as cars or doors can be included in the GUI to provide a reference or standard by which other objects can be gauged.

Linear Perspective is an effect by which portions of an objects extending on a distance from the viewer appear narrower with distance, e.g., standing in the middle of the road and looking ahead, the road will extend away from the viewer and will seem to get narrower with the distance. In the context of this invention, reproducing this "linear perspective" involves placing objects along grid lines that represent their location in space. The grid lines do not need to be seen by the viewer. The linear perspective is created by placing objects along invisible grid lines, adjusting their size depending and the distance/depth that needs to be perceived for each object, and this linear perspective gives depth perception.

Texture gradient involves adding lighting and/or shadowing onto a surface of a displayed object to provide an impression of where the objects is located with respect to a light source or, by providing differentiated lighting/shadowing on different objects, therefore reproducing a contextual environment as would exist in real life, to give the impression that these different objects are not located at the same place.

Aerial perspective refers the perception that distant objects are blurred, and their color saturation is reduced. Their contours are less sharp than for closer objects, and color is less saturated. In the context of this invention, reproducing this "aerial perspective" effect in a computer-generated user interface involves blurring distant objects so that they appear to be further away from the viewer (since real-life distant objects are also blurred by the distance). Color tinting for distant objects may also be provided. According to an embodiment, blurring and/or tinting are very slight so that they do not appear to be exaggerated. The effect is thus detectable but not plainly apparent.

The "relative size" effect occurs if a plurality of identical objects in the environment do not appear with the same size from the viewer's perspective but it is nonetheless clear that they should. Then, the viewer will perceive that the objects are located at different distances and will thus perceive depth. In the context of this invention, this technique is implemented by providing in the environment a plurality of objects of equal size (such as a plurality of identical objects) located throughout the environment, and adjusting the size of each of these identical objects to reflect their respective distance from the viewer in the digital environment.

Defocus Blur is a technique that involves blurring or defocusing/focusing different depths of environment. This strategy adds atmospheric distortion at large distances from the viewer, therefore reproducing a contextual environment as would exist in real life, so that the viewer can perceive depth of planes places at different distances.

Elevation is a technique which can be implemented in an embodiment of the invention and which involves rendering an environment (i.e., background) with an explicit representation of the horizon (e.g., a line) roughly centered in the image. In another embodiment, instead of a horizon or in addition thereto, a vanishing point can be used. When an object is rendered, some of the lines in the object rendering may be expected to be parallel (e.g., edges of a building) but do not appear parallel in the rendering due to the perspective; when these lines are extended, they eventually intersect, thus defining the vanishing point.

According to an embodiment, the application running and outputted on the immersive display comprises a type of background commonly known as a skybox. A skybox refers to a background comprising a panoramic image represented a sky or any distant background having a texture (not a uniform monochrome background). The skybox is normally split into six panels or "textures", each one representing a direction (up, down, left, right, forward and backward). In this embodiment, at least one of the strategies mentioned above is implemented in the skybox to provide a reference to the viewer within the skybox which makes up the background of the application.

According to an embodiment, the near clipping plane (or more generally a near clipping surface) can be set at a particular location in order to enhance immersion. Clipping refers to the selection of only a region (volume defined by border planes) of a 3D environment to be rendered graphically. The near clipping plane is the plane which borders this region and which is the closest to the point of view of the rendering. Meanwhile, in the physical environment in which the observer is presented the graphical rendering, the observer is located at a given distance D from the image surface or from the display screen. According to an embodiment, the near clipping plane is set at this same distance D (e.g., by the operating system which knows the display parameters including the distance D).

Figure 19:
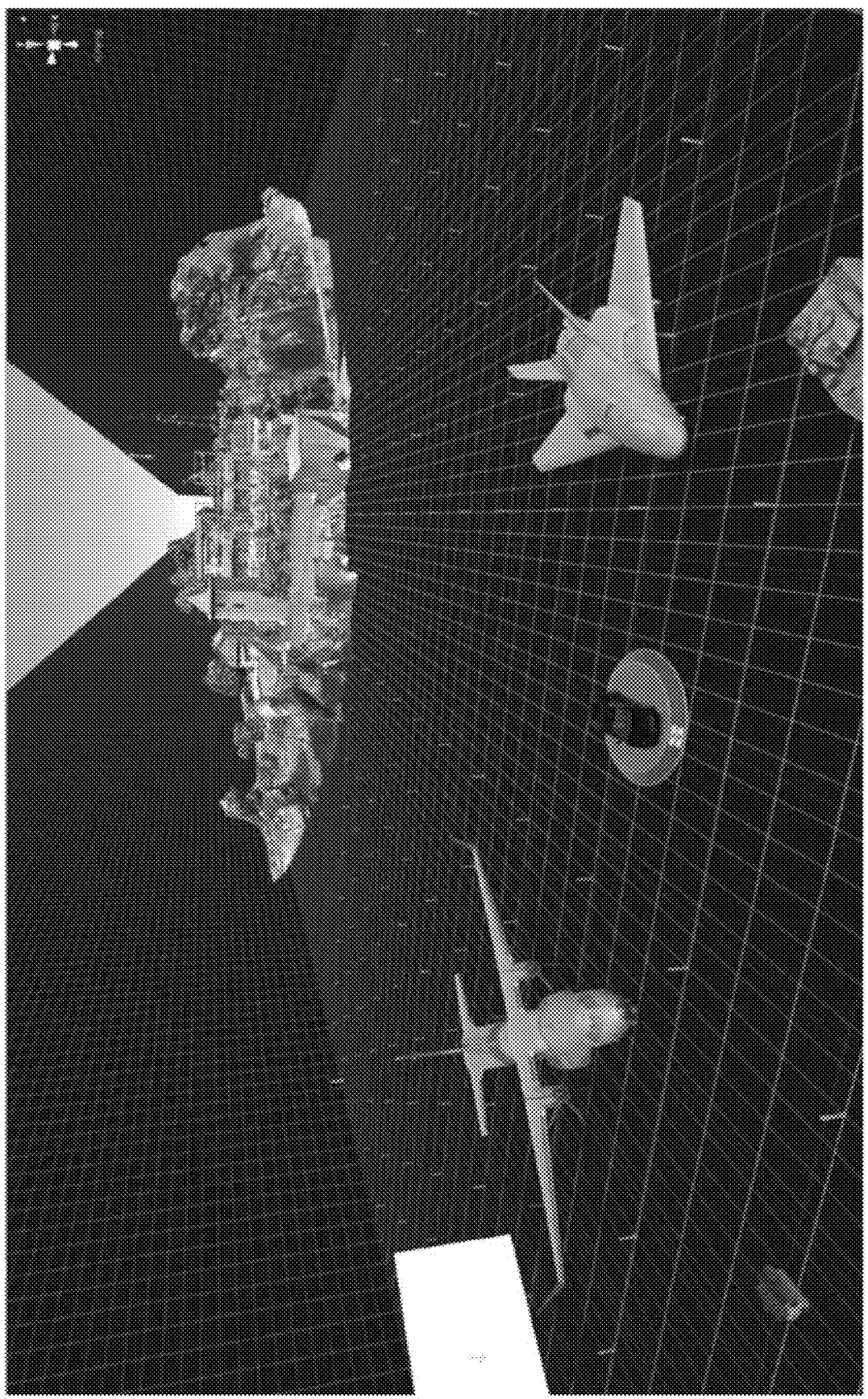
FIG. 19 is a screenshot of a background comprising a plurality of elements acting as cues for depth perception, according to an embodiment.

All strategies mentioned above can be used independently to enhance psychological cues of depth perception and are particularly advantageous for computer-generated contents or user interfaces of collimated displays or immersive displays such as described below in relation with FIGS. 1-9, which illustrate a workstation having an immersive display. FIG. 19 illustrates a plurality of objects which are displayed on a grid using a variety of the techniques exposed above.

There is described below, and shown in FIGS. 1-9, an immersive work station 200 which, among other things, uses a designed virtual surface 240 to create an immersive display, in which such techniques can be advantageously implemented. This immersive display uses the equipment of a collimated display to achieve a more immersive environment by using the designed virtual surface and can benefit from the various techniques of psychological cues for depth perception when displaying objects such as the GUI of the operating system running on the computer system which feeds the immersive display, when using a web browser, when browsing between menus, windows, panels and buttons or when viewing a computer-generated or computer-edited animation involving a plurality of objects.

A work station is an environment in which a user can view content, and possibly interact with it. The display comprises a curved, mirrored surface 240 and a display screen 230 together designed to create an immersive display system using collimated or nearly-collimated light, which is projected taking into account psychological depth cues (especially those described above) that must be provided in the final virtual image. The projector 220 is thus controlled according to a method described further below to create virtual images having a more realistic depth when viewed by the user in the immersive station comprising the immersive display, and further controlled by a computer system to control how digital objects are placed within a digital environment to enhance psychological depth cues in the image rendering to the viewer in the virtual image seen by the viewer. A structure or frame can be used to hold the mirrored surface 240 in place, and optionally serve as a support to hold speakers of the sound systems which are physically located around the user of the workstation to provide immersive audio contents consistent with the immersive image rendering of the display.

Current collimated displays can create very realistic representations of reality for scenarios where objects are typically seen far from the observer (such as in flight simulator displays). These conventional display systems place display screens at the point where light reflected or emitted from these screens create collimated light, once reflecting from spherical mirrors. This is done in order to maximize the depth of the observed image, i.e., to produce the virtual image at a high distance (the "infinity"), usually greater than 60 ft. These displays are referred to as collimated displays, because the light reflected from the projection screen is nearly collimated after it reflects from the mirror's surface.

The immersive display described herein places the display screen closer to the mirror than these systems, at a location sufficiently close to the mirror to present an image to the viewer at closer distances (i.e., the virtual image is produced at a finite and realistic distance, close to the mirror), more representative of typical every-day viewing. This configuration makes it possible to achieve an immersive display for applications where objects need to be shown closer to the observer than in conventional flight simulator displays.

Indeed, conventional collimated displays are extremely effective at achieving immersion when the images displayed are meant to be far from the observer (this is why they are commonly used in flight simulator displays, for which they are very well adapted). These conventional collimated displays (referring to those such as used in flight simulators) are not suited for showing objects near the observer, but immersion can still be achieved for these cases by using collimated or nearly-collimated light.

Another major advantage to this configuration of collimated display, where the display screen is located, with respect to the mirror, closer than the distance that would produce collimated light when reflecting from the mirror, is an increase in the area the observer can view the image with acceptable quality. This area is often referred to as the eyebox of the display. These collimated displays have the added benefit of having two or more times the eyebox size of conventional collimated displays.

Normally, in the context of a conventional collimated display, if a display screen is moved away from the focal point of mirrors, the resulting image will appear distorted, with an odd depth profile to the viewed image.

In order to fix this problem that would have occurred by modifying conventional collimated displays, the screen mirror needs to be redesigned from a spherical shape to a non-spherical shape. This requires tools for designing this shape that should be based on the method described further below.

The display system comprises the components needed to create an optimal sense of immersion by the user for a given application, thanks to a large field-of-view display greater than 30° in at least one direction (horizontal and/or vertical) provided by a mirror close to the user, and to the collimated display system designed to optimize sense of depth using algorithms of virtual image creation described further below.

A mirror too close from the viewer provides a virtual image with poor depth sensation, complicates the optics, and degrades the image quality.

A mirror too far from the viewer produces a virtual image that looks wrong: images seem to be very large and a long way off from viewer when rendering close objects that should have a close virtual image.

The image should be rendered to maximize immersion. By providing the display screen with respect to the screen mirror at a distance closer than in conventional collimated displays and by controlling the projection on the display screen or equivalently by providing a given shape to the screen mirror as determined by the equations presented further below, the image displayed to the viewer is presented with the correct perspective. In other words, the perspective of the rendered image matches the perspective one would see while looking out windows of the same size as the mirrors and at the same location. This maximizes the realism of the displayed image. This is because nearby objects are correctly imaged in a finite-distance virtual image.

There should be applied a frustum correction to convert the commonly used clipped pyramid in computer graphics rendering (the viewing frustum) to a spherical segment adapted to the shape of the screen mirror (i.e., the virtual surface). Alternatively, spherical rendering or other software techniques to render images with the correct perspective can be performed.

According to an embodiment, there is provided in addition to the display system a three-dimensional (3D) sound system, comprising speakers, headphones, or any other sound system that generates sound anchored to a specific location in 3D world around the user.

Sound is tethered to locations in the digital world, and played with a volume, quality, and possibly in a directional manner that complements the rendered image by mimicking real-life sound cues consistently with the images being viewed in the immersive displays.

According to an embodiment, there is provided a system for user interaction with the digital environment in which the user is immersed. The user interaction system should allow manipulation of digital content and navigation through the content presented on the screen, where the presentation of the content is controlled by the operating system. For example, voice commands (using a microphone) can be implemented. A control board in front of the user, with buttons and/or touch commands, can be provided to interact with the operating system. A movement tracking system, comprising cameras or infrared detectors, can be used to track body parts of the user (e.g., their hands) intended to have a meaning according to predetermined rules within the work station. Browsing through the digital content and performing manipulations should be intuitive. Pointing to a specific element in the displayed digital content with a finger, as detected by cameras or infrared detectors, to select a given element in the content presented to the user is an example of an intuitive operation performed on the content.

As mentioned above, imaging an object at infinity, as performed in collimated displays, is not always desirable, as the simulation may include objects that would normally be close to the viewer. The image therefore does not appear realistically. Furthermore, the slight angular difference of a virtual image between both eyes of a viewer serves as a cue interpreted by the viewer to determine the distance of what is being seen. The lack of this cue can be confusing and does not provide adequate realism.

There is described below a method for determining and eventually controlling the location of a virtual image in a non-planar mirror display that is far more robust, showing the results for a 2D parabolic mirror viewed at large angles with respect to the optical axis of the parabola, and for a hemispherical mirror. This method is also useful to remove optical aberrations in the virtual images. These results are in agreement with ray-tracing simulations as well as experimental measurements. This technique can be extended to be used for other types of mirrors, as well as for image formation for off-axis lenses. Display of virtual images, such as a display for a simulator, can thereby be improved. The display thus advantageously optimizes the sense of depth to provide the visual component of the immersive environment.

In collimated displays, a projector first projects an image onto a surface acting as an object that must be mirrored to form a virtual image of this object that will be viewed by the user. The objects are thus viewed "through" a mirrored surface as the virtual image is located behind the mirror. Collimated displays provide a virtual image at infinity, first because flight simulators often image objects that are supposed to be located far away, and secondly because Gaussian optics is adapted to approximating the virtual image at infinity. However, it is advantageous and sometimes necessary to determine more precisely the location of this image, however there remains a lack of techniques suitable for this purpose.

There are two primary reasons for the lack of techniques. One is due to the breakdown of Gaussian optics, and consequently popular physics equations such as the thin lens equation or paraxial mirror equation. These equations, while extremely useful for determining virtual images close to the optical axis of lenses or mirrors, are not valid for objects or viewers that are at large angles with respect to this axis.

The second reason arises due to misconceptions on virtual images themselves. The virtual image of an object viewed through a lens or reflecting from a mirror is commonly portrayed as if it is independent of the viewer's position, though in fact this is only true when the object is viewed close to the optical axis of the lens or mirror. To complicate matters further, the location of a virtual image viewed by a human observer is a psychological phenomenon, which depends on several depth cues that sometimes conflict. This can lead to surprising results, including the virtual image location changing when a viewer tilts her head.

In order to accurately determine the location of a virtual image viewed off the optical axis of a lens or non-planar mirror, one must depart from Gaussian optics, have a proper understanding of the different depth cues used to determine the depth of the object as well as their relative importance, and find a practical way to resolve these conflicting cues.

The human brain uses a wide variety of depth cues to determine the depth of an object. These cues consist of both physiological and psychological cues. The depth cues affected by a mirror's and object's shape are the physiological cues, including accommodation, convergence, and binocular and monocular parallax. The accommodation cue for depth arises from the need to bend or relax the lens of the eye in order to see an image in focus. The amount of constriction for the lens that is necessary to bring the image into focus gives a cue to the rough distance of the image from the eye. This physiological, monocular cue for depth is known as accommodation, though it is the cue relied on least by the human brain to infer depth. This cue only tends to contribute to perceived depth for objects less than about 2 m from the viewer. The convergence cue comes from the need for the eyes to be directed at slightly different angles to see an image clearly. The angle between the eyes is used as a cue for depth, though this physiological, binocular cue is only effective to distances of approximately 10 m. The final two cues arise from viewing an object from at least two different viewpoints. Binocular parallax arises from the brain seeing an image from both eyes at once, while monocular parallax comes from the brain seeing an image from different locations at different times. In both cases, the brain is able to infer depth based on the relative movement of objects viewed from the two or more different locations. Binocular parallax is an effective depth cue up to a distance of about 20 m. The strength of the monocular parallax cue depends on the amount of movement of the head, with movements of only a few mm sufficient to contribute to perceived depth.

For real world objects viewed directly these cues will give depth cues that are all in agreement. When viewing virtual images in lenses or mirrors, however, these cues can give conflicting results. For instance, when viewing objects through a lens or reflecting from a mirror, where the viewer needs to focus their eyes to see an image often differs from where the viewer sees the image via stereoscopic cues, a problem sometimes referred to as the vergence-accommodation conflict. This conflict also occurs when viewing an object reflected from a curved mirrored surface, and so must be accounted for when determining the virtual image location. By properly taking into account depth cues, and tracing rays from a viewer, to a mirror, and to an object, one can determine the virtual image location.

The method for determining a virtual image has two bases: first, using techniques valid where standard Gaussian techniques are not, and second, simplifying the problem of the many different, conflicting depth cues used by a human observer into a simpler, resolvable problem.

The problem is simplified by determining the virtual image of an object by determining only the horizontal parallax cue, which is for movement of the observer's head along a direction parallel to the plane defined by the floor or the ground or any other reference element. Human observers are far more likely to move in directions parallel to the plane they stand on than they are to move up and down vertically, or to move their head forward and backward, so this result is the most important for most applications. In addition, this cue is equivalent to the stereoscopic parallax and convergence cues. Cues such as accommodation are ignored as they do not significantly contribute to perceived depth at distances greater than 2 m, and parallax cues for movement in different directions is ignored since human observers are much less likely to move in these directions. This results in depth cues that are in agreement with one another, and hence a single virtual image can now be determined.

There was thus described above a method that can be used to determine the virtual surface of an object viewed from a mirrored surface. This method relies on recognizing the most significant, consistent depth cues used by the viewer, and then calculating the result for these cues based on a semi-analytical ray-tracing technique designed to work where Gaussian optics techniques do not. The method described above relied on treating a mirror as composed of many infinitesimal sections of mirrors, each with its own curvature and optical axis.

This method for determining a virtual image surface was designed to be practical and convenient for designing an object screen or mirrored surface to create a desired virtual surface for a human observer at a known location, for example in a work station, a flight simulator, a home theater, or the like. It can further be used when displaying the digital scene as discussed above, such as computer-generated media content (e.g., video game, animation, etc.), the graphical user interface (GUI) of the operating system (OS), an application which involves boxes, windows, panels, buttons and the like, a web browser, or any application presenting objects in front of a background, for example.

The method can be used to determine the location of an object displayed on a display screen that, when viewed reflecting on a curved mirror, produces a virtual image that provides a parallax and/or stereoscopic cues, which optimizes the sense of depth giving greater realism to the display. This can be used to achieve a greater sense of visual immersion in the context of the immersive display, as contemplated. The display would thus include a projector and intermediate screen, where the projector is controlled by a processor executing a program for projecting each portion of an image at a specific location on the intermediate screen to produce the virtual images as contemplated by the method of determination described above.

The method can also be used to determine the shape of the curved mirror and/or the shape of the display screen ensuring that, when an object is viewed reflecting on a curved mirror, produces a virtual image of the object that provides a parallax and/or stereoscopic cues. The display would thus include such a curved mirror.

This method can be extended to work with mirror shapes other than just hemispheres, as well as with lenses that cannot be accurately modeled using conventional techniques. Therefore, even though the equations developed above are to be used in reflection, a similar set of equations can be developed for refraction to account for parallax or stereoscopic cues when an image is viewed through a lens. Either the lens, the location of the object or the shape of the display screen on which the object is displayed can be determined to ensure the image viewed by the user (e.g., virtual image for a divergent lens) is produced to provide parallax or stereoscopic cues.

The method described above is used to control the location of a projected image portion by a projector which projects onto a display screen which generates a specific virtual image when the display screen is viewed reflecting from a mirror.

The display screen can be a LCD screen, a rear projection screen, a front projection screen or any other display screen suitable to be viewed reflecting from a curved mirror such that the final image is eventually rendered by the curved mirror.

Figure 14:
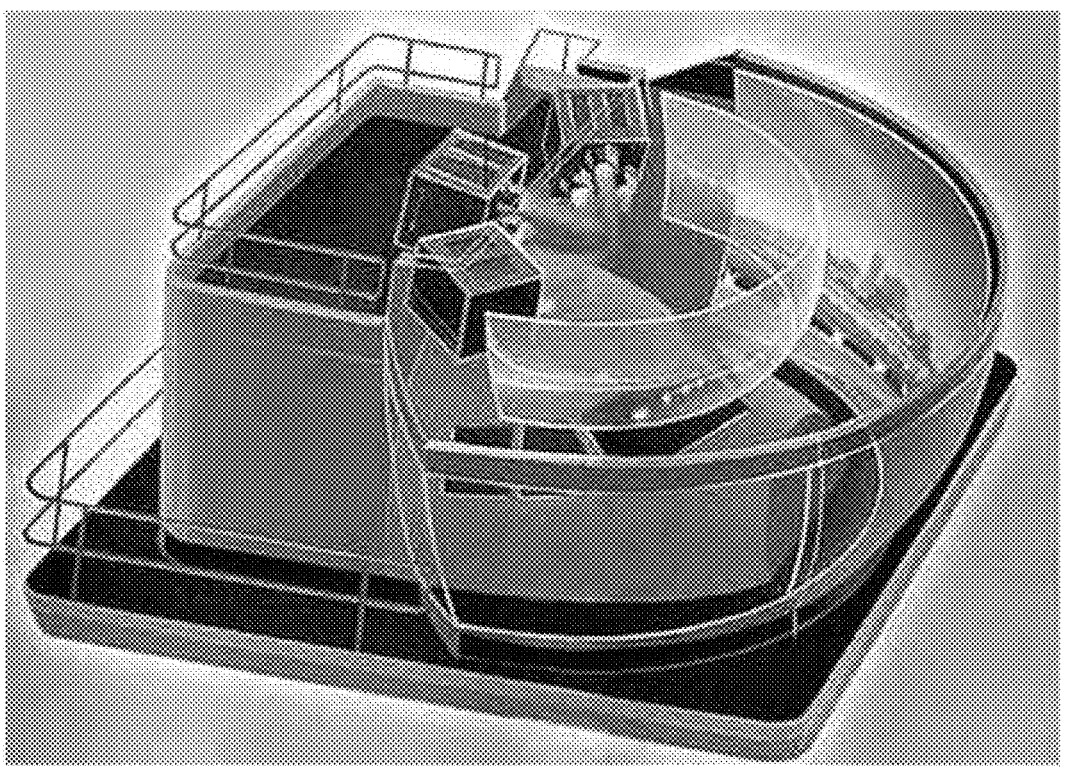
Figure 15:
FIG. 15 is a picture illustrating image display in a simulator, according to the prior art.
Figure 16:
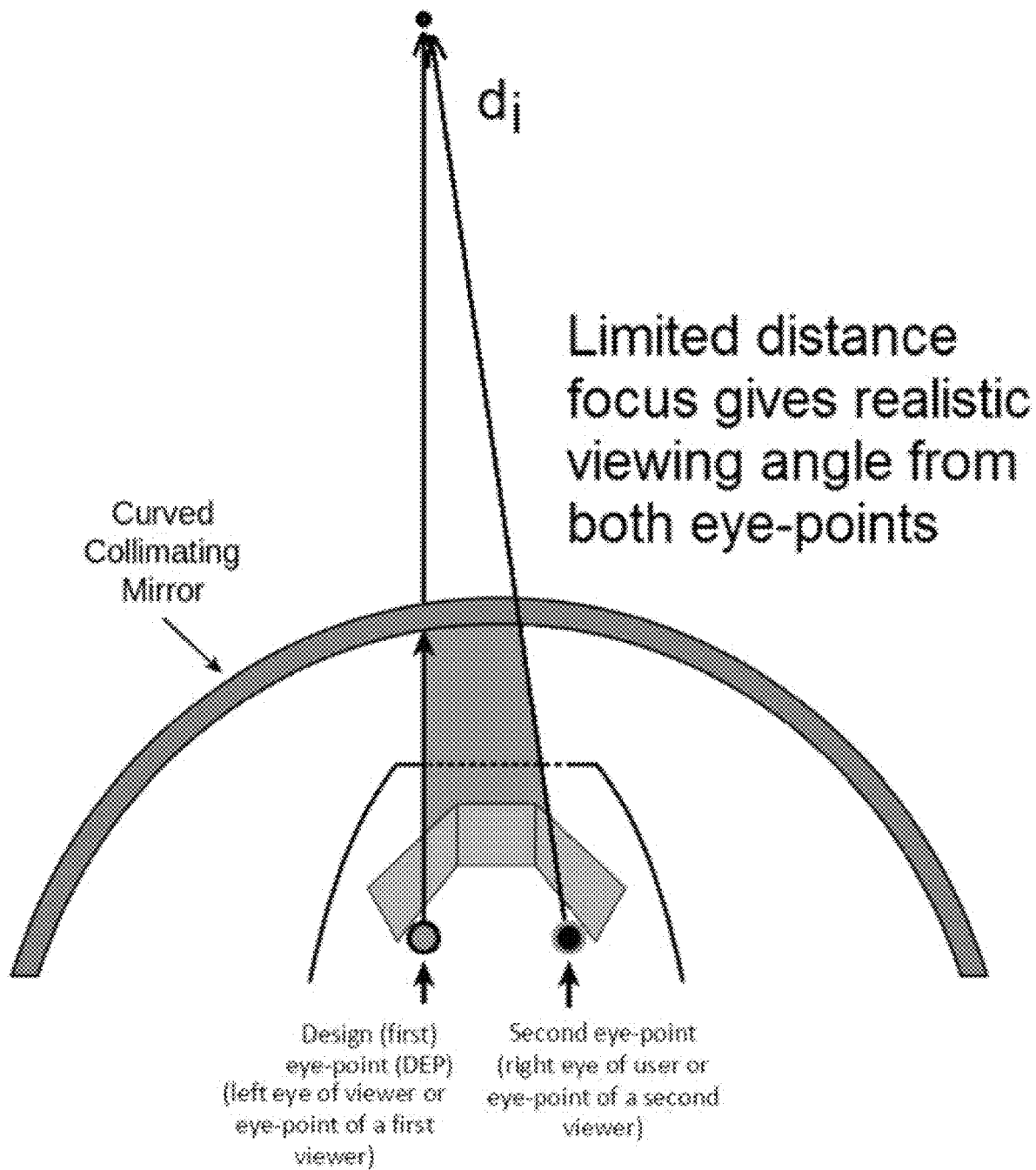
FIG. 16 is a top view illustrating image display in a simulator as seen by two pilots, according to an embodiment.

For example, as shown in FIGS. 14-15, a state-of-the-art collimated display is shown, exemplarily embodied as a flight simulator. The cockpit is physically close to the pilot trainee. The cross-cockpit is the virtual image, reflected by the collimating mirror, of an image produced on a projection screen by projects. The virtual image is located at infinity.

Figure 18:
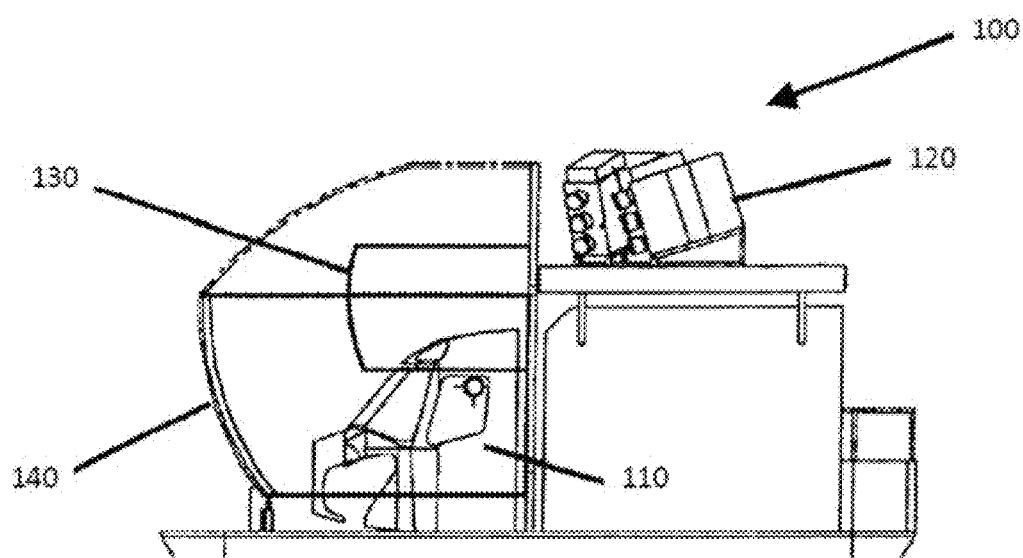
FIG. 18 is a side view illustrating a flight simulator, according to an embodiment.

A flight simulator 100 having a collimated display for implementing the method is shown in FIG. 18. The pilot trainee is installed in the cockpit 110 and views the virtual images as reflected by the mirror 140 from the object, which is the projection screen or display screen 130. The object is created by having the projectors 120 illuminating the display screen 130. By using the method described above, the following steps can be performed:

1) Determining the location of the observer that will be viewing the virtual image and the direction the observer is facing (in order to determine the interocular vector R);
2) Determining the shape and location of the mirror in space;
3) Defining the desired virtual image/surface, and consequently the image distance from the observer to the desired surface.
4) Determining the object distance from the mirror to the projection screen or display that will achieve this desired virtual image, where the projection screen or display is located at a distance from the mirror which is smaller than the focal length of the mirror.
5) Controlling the image projected by the projectors 120 to get the targeted projected image on the display screen 130.

Figure 17:
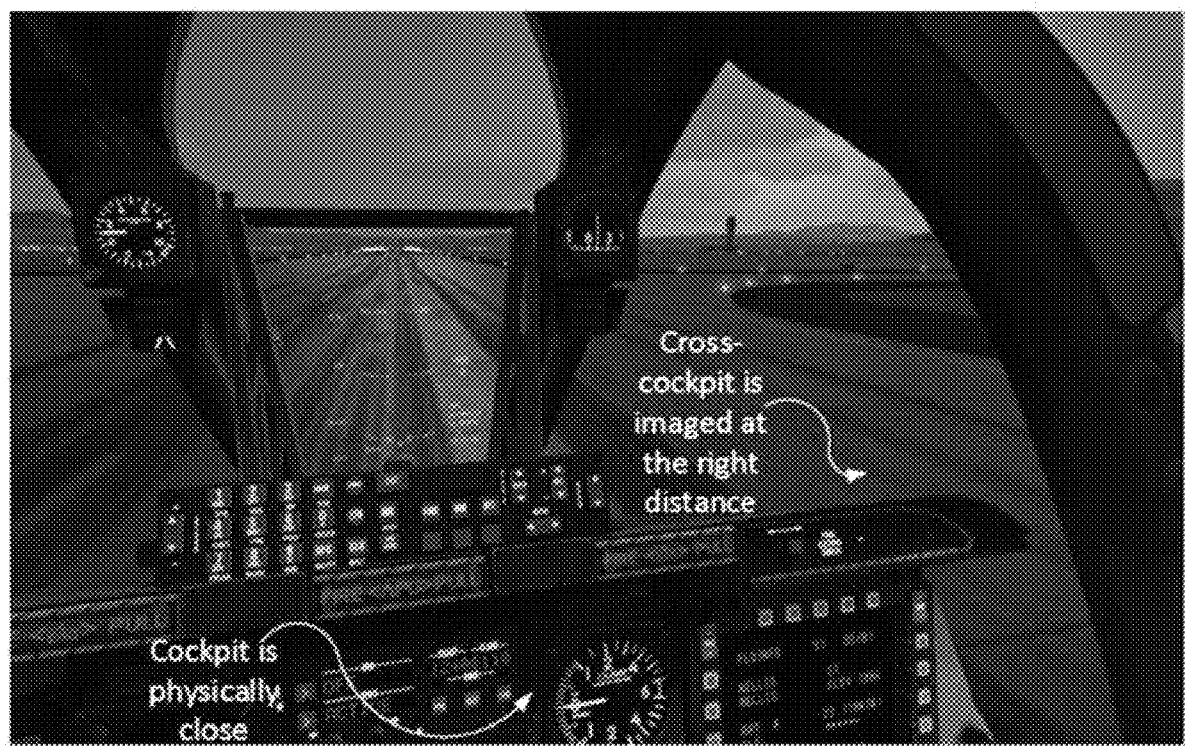
FIG. 17 is a picture illustrating image display in a simulator, according to an embodiment.

The result for the user, as shown in FIG. 17, is that the cross-cockpit image is now imaged at a finite distance that is more realistic that an image substantially imaged at infinity.

The technique can be applied to other technological contexts. More generally, a work station can be provided with the collimated display producing virtual images with depth cues giving more realism to the visual contents being viewed by the user.

The method described above can provide much larger convergence and/or divergence tolerances for a collimated display. Regarding convergence and divergence, when an observer looks at an object, they direct their two eyes towards it. The angle between the direction vectors of their two eyes is known as the convergence angle. When their two eyes are directed away from one another, the angle between them is the divergence angle. When the angle is divergent, the situation is painful for the brain, and this situation is rarely encountered unless the observer looks at a curved mirror. When looking at something close to the observer, the convergence angle between the eyes is large, and when looking at an object very far away, the convergence angle is almost zero. For collimated displays used in flight simulators, the convergence angle is close to zero because the virtual surface is at a long distance in front of the observer. If the observer moves away from the designed eye point, however, the image can distort, and so the user will either have to converge their eyes more to see the image clearly or, more commonly, need to diverge their eyes to see an image, which makes the display very painful to look at. This can happen when an observer moves as little as 20 cm from the eye point. If the virtual surface of a collimated display is brought closer, however, the convergence angle is much higher at the eye point. If the observer moves 20 cm from the eye point in this case, the convergence angle will drop, but will not result in divergence. This results in a much larger area in which the observer can comfortably view the display. It is advantageous not only for observer comfort but also to allow more people to view the display at the same time. The method described above ensures that the virtual image provides a parallax and/or stereoscopic depth cues, may allow for locating the curved mirror closer to the user and thus improves the tolerance on convergence/divergence experienced by the binocular observer moving horizontally.

Embodiments of a work station 200 are shown in FIGS. 1-9. The display screen 230 and/or the mirror(s) 240 have shapes defined by the equations above. The projectors are controlled by a program defined by instructions executed on a computer system in communication with the projectors to project an intermediate image on the display screens 230 which in turn are the object forming the virtual image when reflected by the mirror(s) 240. The distance between the display screens 230 and the mirror(s) 240 is substantially smaller than the distance that would produce completely collimated light. This allows for a virtual image produced at a finite location when viewed by the user of the work station 200. By placing the display screens 230 closer to the mirror(s) 240, the whole system is advantageously rather compact, as shown in the figures. A table or control board 270 can be provided in front of the user. Other elements, such as a sound system or control commands as discussed above, can be provided. The overall result is an environment in which objects that should be close to the user in the environment appear effectively closer, with a right sense of depth thanks to the depth cues provided by the shape of the mirror(s) 240, or the shape of the images projected by the projectors 220 on the display screens 230 taking into account the depth cues.

The work station 200 described above can thus be used to implement a digital environment designed to maximize or increase depth sensation. As mentioned above, the work station comprises a computer system. It comprises a memory for storing instructions and data, and a processor for executing the instructions. The computer system is in communication with the projectors 220. The computer system generates the signal for the projection and display, and can act on what is projected. The computer system, when instructing the projectors of the work station 200 (or of a collimated display) implements at least of the following elements:

Parallel lines extending along a planar or non-planar floors, walls, ceilings, or obstacles or any other reference element;

Objects placed so that they will occlude each other and portions of the environment;

Objects or lighting artifacts moving through environment at approximately constant speeds;

Approximately constantly rotating objects, floors, ceilings, or walls;

Placing objects of a size that is familiar to the observer, such as doors or automobiles, etc.;

Lighting sources in digital environment designed to creating texture gradients and shadowing;

Blurring or color tinting of distant objects, or effects such as atmospheric distortion for objects at large distances;

Using many objects of equal size placed at different distances;

Placing horizon and/or vanishing point within rendered image;

Setting the near clipping plane or surface of the rendered image to be equal to the distance from the observer to the display screen or image surfaces.

More specifically regarding the last element in this list, according to an embodiment, displaying the plurality of digital objects within the digital environment is controlled by the computer system for setting at least one of a near clipping plane and a far clipping plane of the image rendering to be equal to a characteristic distance in the immersive environment. The characteristic distance comprises one of the following distances: a distance from an observer to display screen; a distance from the observer to mirrored surface; a distance from the observer to the virtual image itself; a distance from the observer to a lens or any other refracting element, or from the observer to any other optical element which contributes in producing the virtual image. Doing this ensures consistency in image creation and produces an appropriate cue for the observer.

These techniques can be implemented such that digital objects are placed within a digital environment to eventually provide an image rendering with enhanced depth perception using these psychological cues. The implementation can be done, for example, within an operating system of the computer system designed to be used in an immersive environment, or in a video or computer-generated or computer-edited animation designed to be displayed in an immersive environment, or in an application installed or used within the computer system and having a background, or "skybox", or in an image or background designed to be displayed in an immersive display environment, or in a web browser/web portal/web environment to be displayed in an immersive environment and used on the computer system which implements at least one of the techniques mentioned above.

The method described above can be applied advantageously on immersive displays involving mirrors as described above. However, it could also apply to immersive displays that do not involve mirrors, such as direct-projection displays or even VR head-mounted displays (HMDs). In these mirror-less displays, the rendered fields of view (those rendered in the environment on the display) match the fields of view subtended by the display to the viewer. This is the reason why the method described above can apply to direct-projection displays and VR HMDs.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for operating an immersive display to provide a monocular psychological depth cue to the viewer by controlling an image rendering wherein the image rendering provides or enhances depth sensation to the viewer based on specific parameters of the immersive display, the method comprising:

providing a display screen and a mirror forming the immersive display which does not have any component being head-mounted and which is remotely distant to a viewer, the display screen being only visible to a design eye point via the mirror which forms a virtual image of the display screen;

displaying on a display screen a plurality of objects within an immersive environment, to provide to the viewer the image rendering that is immersive; and by a computer system:

controlling the image rendering of the immersive environment, the controlling being based on fields of view subtended by the display screen for the viewer via the mirror with respect to the design eye point, the controlling comprising rendering fields of view in the immersive environment on the display screen via the mirror which substantially match fields of view subtended by the display screen for the viewer via the mirror with respect to the design eye point to provide the monocular psychological depth cue to the viewer; and controlling a size and a location of each one of the plurality of objects, the controlling being based on a distance between the display screen and the design eye point to provide the monocular psychological depth cue to the viewer for each one of the plurality of objects, wherein the controlling of the image rendering by the computer system is thereby based on specific parameters of the immersive display.

2. The method of claim 1, wherein displaying the plurality of objects within the immersive environment comprises displaying on the display screen distant from the viewer at the design eye point at a distance D.

3. The method of claim 2, wherein controlling the image rendering of the immersive environment comprises setting a near clipping plane to be equal to the distance D.

4. The method of claim 1, further comprising:
providing a curved mirrored surface in addition to the display screen to perform the displaying.

5. The method of claim 4, wherein the curved mirrored surface and the display screen are provided at a distance D smaller than the distance that would produce collimated light when reflecting from the curved mirrored surface.

6. The method of claim 5, wherein controlling the image rendering of the immersive environment comprises setting a near clipping plane to be equal to a distance from the viewer to the curved mirrored surface.

7. The method of claim 1, wherein controlling the image rendering of the immersive environment and the size and the location of each one of the plurality of objects comprises placing each one of the plurality of objects in the environment and controlling the image rendering of the immersive environment to provide visible parallel lines extending along reference elements in the immersive environment.

8. The method of claim 1, wherein controlling a size and a location of each one of the plurality of objects comprises applying a movement on the plurality of objects, or a lighting artifact thereof, shown at approximately constant speeds with respect to the immersive environment.

9. The method of claim 1, wherein controlling the image rendering of the immersive environment comprises inserting or defining a reference element in the immersive environment, and wherein controlling a size and a location of each one of the plurality of objects comprises applying a rotation between each one of the plurality of objects and the reference element of the immersive environment.

10. The method of claim 1, further comprising blurring or tinting a color rendering of the each one of the plurality of objects depending on a respective distance thereof from the viewer.

11. The method of claim 1, wherein controlling the image rendering of the immersive environment comprises at least one of displaying a horizon or providing graphic elements in the immersive environment which define a vanishing point.

12. The method of claim 1, further comprising providing user controls for interacting with contents of the immersive environment and the plurality of objects.

13. A method for operating an immersive display which produces a virtual image, to provide a monocular psychological depth cue to an observer by controlling an image rendering wherein the image rendering provides or enhances depth sensation to the observer based on specific parameters of the immersive display, the method comprising:

providing the immersive display comprising a display screen and an optical component which produces the virtual image of the display screen, both the display screen and the optical component remotely distant from the observer at a design eye point; thereby not have any component which is head-mounted and leaving the observer free of any head-mounted component;

using a computer system to locate a plurality of digital objects within a 3D digital environment on the display screen of the immersive display, based on a characteristic distance in the immersive environment defined from the observer at the design eye point to any one chosen among an optical element producing the virtual image of the display screen, an optical distance to the display screen, and an optical distance to the virtual image, to provide an image rendering that provides or enhances depth sensation and is immersive for the observer at the design eye point;

wherein displaying the plurality of digital objects within the 3D digital environment is controlled by the computer system for:

providing a near clipping plane and a far clipping plane of the image rendering defining a volume of the 3D digital environment to be rendered graphically; and setting at least one of the near clipping plane and the far clipping plane to be equal to the characteristic distance in the immersive environment.

14. The method of claim 13, wherein the optical element to define the characteristic distance from the observer is the display screen.

15. The method of claim 13, wherein the optical element which produces the virtual image of the display screen to define the characteristic distance from the observer is a mirror.

16. A method for operating a computer system for an immersive display, to provide a monocular psychological depth cue to an observer by controlling an image rendering wherein the image rendering provides or enhances depth sensation to the observer based on specific parameters of the immersive display, the method comprising:

providing the immersive display comprising a display screen and an optical component which produces a virtual image of the display screen, both the display screen and the optical component remotely distant from the observer; thereby not have any component which is head-mounted and leaving the observer free of any head-mounted component;

providing an operating system on the computer system that places a plurality of digital objects within a 3D digital environment on the display screen of the immersive display distant from the observer to provide an image rendering that is immersive, the placing being based on a characteristic distance in the immersive environment defined from the observer at the design eye point to any one chosen among an optical element producing the virtual image of the display screen, an optical distance to the display screen, and an optical distance to the virtual image;

wherein displaying the plurality of digital objects within the 3D digital environment is controlled by the operating system on the computer system to implement a monocular psychological depth cue to the observer for each one of the plurality of objects, further comprising:

providing a near clipping plane and a far clipping plane of the image rendering defining a volume of the 3D digital environment to be rendered graphically, and setting at least one of the near clipping plane and the far clipping plane to be equal to characteristic distance in the immersive environment defined from the observer.

17. The method of claim 16, wherein the characteristic distance is defined from the observer to the display screen.

18. The method of claim 16, wherein the characteristic distance is defined from the observer to the rendered image.

19. The method of claim 16, wherein the image is produced by a lens which images the display screen, and the characteristic distance is defined from the observer to the lens.

\* \* \* \* \*